United States Patent
Webb, Jr. et al.

(10) Patent No.: US 6,738,896 B1
(45) Date of Patent: May 18, 2004

(54) METHOD AND APPARATUS FOR DETERMINING AVAILABILITY OF A QUEUE WHICH ALLOWS RANDOM INSERTION

(75) Inventors: David Arthur James Webb, Jr., Groton, MA (US); James Keller, Palo Alto, CA (US); Derrick R. Meyer, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/495,190

(22) Filed: Jan. 31, 2000

Related U.S. Application Data
(60) Provisional application No. 60/118,130, filed on Feb. 1, 1999.

(51) Int. Cl.$^7$ ................................................. G06F 9/30
(52) U.S. Cl. ....................................... 712/214; 712/217
(58) Field of Search ............................... 712/214, 215, 712/217, 218, 225

(56) References Cited

U.S. PATENT DOCUMENTS

| | | | | |
|---|---|---|---|---|
| 4,847,755 A | | 7/1989 | Morrison et al. ............ 364/200 |
| 5,155,843 A | | 10/1992 | Stamm et al. ............... 395/575 |
| 5,627,983 A | * | 5/1997 | Popescu et al. ............. 712/217 |
| 5,822,559 A | * | 10/1998 | Narayan et al. ............. 712/214 |
| 5,870,578 A | * | 2/1999 | Mahalingaiah et al. ...... 712/215 |
| 5,872,946 A | | 2/1999 | Narayan et al. ............. 395/380 |
| 6,112,019 A | * | 8/2000 | Chamdani et al. .......... 712/214 |
| 6,115,807 A | * | 9/2000 | Grochowski ................ 712/212 |
| 6,148,394 A | * | 11/2000 | Tung et al. ................. 712/218 |
| 6,182,210 B1 | * | 1/2001 | Akkary et al. .............. 712/235 |

OTHER PUBLICATIONS

Popescu, V.; Schultz, M., Spracklen, J.; Gibson, G.; Lightner, B.; Isaman, D. IEEE Micro, vol. 11 Issue: 3, Jun. 1991. Page(s): 10–13, 63–73.*

Keller, J., "The 21264: A Superscalar Alpha Processor with Out-of-Order Execution," Paper present at the Microprocessor Forum on Oct. 22–23, 1996.

Farrell, J.A. and Fischer, T.C., "Issue Logic for a 600–Mhz Out-of-Order Execution Microprocessor," *J. Solid-State Circuts* 33(5): 707–712 (1998).

Scott, A.P., et al., "Four-Way Superscalar PA–RISC Processors," *J. Hewlett-Packard* 1:1–9 (Aug. 1997).

(List continued on next page.)

*Primary Examiner*—Eddie Chan
*Assistant Examiner*—Charles Harkness

(57) ABSTRACT

A method and apparatus to allow program steps in an issue queue to be sent to the execution queue in a non program order provides reduced stall by allowing out of program order steps to be executed as needed resources become available. The method uses a modulus operation to preassign locations in the execution queues, and keep the entries in proper program order. The method employs an additional bit to represent the modules result (valve) and may also utilize a load store number mapping memory to increase execution speed. With such an arrangement a computer system may decrease the lost performance due to waiting for required resource (i.e., memory or bus) availability for the current instruction, by issuing instructions for which the memory or bus resource is available even though the instruction is not the next one in the original program order. Thus the present invention allows memory reference instructions to issue as resources are available.

19 Claims, 2 Drawing Sheets

OTHER PUBLICATIONS

Farrell, J.A. and Fischer, T.C., "Issue Logic for a 600–MHz Out–of–Order Execution Microprocessor," Symposium on VLSI Circuits Digest of Technical Papers, pp. 11–12 (1997).

A Tour of the P6 Microarchitecture [online], [retrieved on Mar. 10, 1999]. Retrieved from the Internet <URL:http://eecad.sogang.ac.kr/AboutSite+Others/Others/intel/procs/p6/p6white/p6white.htm>.

A 56–Entry Instruction Reorder Buffer [online ], [retreined on Mar. 10, 1999]. Retrieved from the Internet <URL:http://www.hp.com/ahp/framed/technology/micropro/micropro/pa–8000/docs/56entry.html>.

Fischer, T. and Liebholz, D., "Design Tradeoffs in Stall-–Control Circuits for 600MHz Instruction Queues," Paper presented at the IEEE International Solid–State Circuits Conference (Feb. 1998).

Kessler, R.E., Compaq Computer Corporation, "The Alpha 21264 Microprocessor," *IEEE Micro* 24–36 (Mar.–Apr. 1999).

Gieseke, Bruce A. et al., Digital Semiconductor, Digital Equipment Corporation, "A 600MHz Superscalar RISC Microprocessor with Out–Of–Order Execution," ISSCC97/Session 10/High–Performance Microprocessors/Paper FA 10.7, *IEEE International Solid–State Circuits Conference*, 176–177, 451, (1997).

Gwennap, Linley, "Digital 21264 Sets New Standard," Microdesign Resources, *Microdesign Report* (Oct. 28, 1996).

Liebholz, Daniel and Razdan, Rahul, Digital Equipment Corporation, "The Alpha 21264: A 500 MHz Out–of–Order Execution Microprocessor," from Compcon Feb., 1997 Proceedings.

* cited by examiner

| INUM (PROGRAM ORDER) | INSTRUCTION | | LSN |
|---|---|---|---|
| 1 | LD | MEM. REF. INST. | ∅ |
| 2 | ADD R6 + R9 → R10 | ARITH. OP. | – |
| 3 | SUB R5 - R4 → R9 | ARITH. OP. | – |
| 4 | LD | MEM. REF. INST. | 1 |
| 5 | LD | MEM. REF. INST. | 2 |
| 6 | STO | MEM. REF. INST. | ∅ |
| 7 | LD | MEM. REF. INST. | 3 |
| 8 | LD | MEM. REF. INST. | 4 |

METHOD AND APPARATUS FOR DETERMINING AVAILABILITY OF A QUEUE WHICH ALLOWS RANDOM INSERTION

RELATED APPLICATION

This application claims the benefit of U.S. Provisional Patent Application No. 60/118,130 filed Feb. 1, 1999, entitled, "A Generalized Push-Pull Cascade Logic Technique" by Mark Matson, et al. the entire teachings of which are incorporated herein by reference.

BACKGROUND OF THE INVENTION

It is well known that computer operating speed benefits from providing queues that hold software instructions in the correct order as issued from the main processor, rather than completing a single issued operation instruction and then returning to the main processor to obtain the next instruction. One benefit of using queues to store the instructions temporarily while waiting for an opportunity to execute the instruction is that the main processor may issue a group of instructions to the queue, and continue operating on other portions of the overall program without having to wait for the results of the instructions to arrive. Another benefit of using queues is that the main processor may have separate queues for different types of functions and thus send out parallel series of instructions that result in increased overall system speed. Typical types of queues may include memory load queues, store to memory queues, and arithmetic operation queues.

Typically, most processors issue instructions in the same order that they are specified in the software program. This is because the order of operations is very important in a software program, and issuing instructions out of the proper order may likely result in an incorrect result. Therefore typically, the instruction queue receives the instructions in the same order as issued by the main processor, and presents them for execution in that same order. An example of the operation of a queue might be a first in first out (i.e., FIFO) system where the instruction is sent to the first available queue location in a series of queue locations. As soon as the prior queue location becomes available, the instruction is moved up, and so on until the instruction reaches the first queue memory location and is executed as soon as the needed resource is available. Note that not all queues operate in the same fashion as this illustrative example, but some method of maintaining the order of instruction issuance is needed.

The queues discussed above are a form of memory, and like any memory resource, they have a finite size or storage capacity. Making a queue larger results in greater ability to buffer the issuance of instructions from the main processor, and therefore increases the overall system operating speed in many circumstances, but at the expense of increased system cost and size. However, the main processor must know when the queue is full, i.e., when the execution of the instructions is not keeping pace with the main processor s ability to issue new instructions, or else there will be issued instructions that overflow the queue's memory capacity and become lost. A lost instruction is likely to result in an erroneous program output and consequent system failure.

Since historically the processors issued instructions in the same order as the instructions occur in the program, and the order of instructions is the same in the queues, then knowing when a queue has reached its maximum capacity, i.e., the queue is full, is important. Since the operation of a queue necessarily requires that it be known whether or not a particular memory location has a current instruction resident, then detecting whether or not the queue is full is straight forward in the case of sequentially ordered and issued instructions since all previous queue memory locations will be occupied. For example, in the illustrative FIFO case, the main processor will know to stop issuing instructions to a queue that has the last queue location filled. Note again that other queue types operate differently from the illustrative example, but in all types of queues the main processor may determine whether or not a particular queue is full.

It would improve the overall computing system speed of operation if the instructions in a queue could be executed out of the sequential order in which they were issued, since the resource (for example a particular memory location) needed for the next instruction in the normal execution order may not be available, while the resource needed for an instruction that is five memory locations behind the next instruction may be available right now. It improves the efficiency of the system to use available resources and not wait for the currently needed resource to become available. However, this requires that certain types of instructions be allowed to be executed out of the issuance order, and creates a problem with the main processor not being able to easily determine when a particular queue is full. This is because when a particular instruction, for example a memory reference instruction, issues, not all of the other memory reference instructions prior to it in the program order need necessarily have already been issued.

It would be a benefit to the overall computer system speed of operation to provide a method and an apparatus to allow random insertion of instructions into a queue while still allowing the main processor to know when the instruction queue is full.

SUMMARY OF THE INVENTION

A method and an apparatus for allowing random insertion of certain types of computer instructions into a queue consists of assigning each program step (i.e., instruction) of the certain type a unique number, e.g., a load store number (LSN), and issuing each program step to the appropriate execution queue (for example a load queue). The program step is assigned at a random time to a specific numbered location in the selected execution queue based upon an ascending INUM order of the program steps in the particular execution queue. A modulus value is calculated for the instruction based upon its numbered location in the particular queue, with the divisor of the modulus equal to the number of the location in the particular queue, and a status bit is set based upon the product of the modulus. A valid bit is set for the program step until the execution of the step is completed. The next program step with the same modulus that is issued is compared to the value of the previous instruction's valid bit and to the status bit. The queue is determined to be full and not capable of accepting further issued instructions based upon the compared values of the valid and status bits. The program number (INUM) and the location in the selected execution queue is recorded in a load store if the selected numbered location is empty, and a memory full flag is transmitted to the issue queue if the selected location is occupied.

In general, the queue entries are pre-allocated for each memory reference instruction in its respective queue at the time that the instructions are fetched from the main processor program store. Since the instructions are fetched in the same order as the program order, then the queue entries are pre-allocated in program order. A special queue, known as the random access queue, is used for instructions that may be executed in random order, for example, memory reference instructions. Note that the random access queue is not the same queue as the instruction queue.

A load store number (i.e., LSN) table maintains a mapping between the sequential number of an instruction (INUM) in the program order and its location in the queue, known as the queue entry number. Separate numberings are maintained for loads and saves, also maintained is one extra bit of information beyond what is required to describe the queue location (queue entry number). This extra bit is known as the modulus status bit (MSB) and is used to determine the execution status of any particular instruction in the queue. As instructions issue, their INUM is used to access the proper pre-allocated queue location using the LSN and the extra MSB bit.

Next the instruction is presented to it's respective queue entry. The instruction to be executed is compared to its respective memory queue entry, and hence the MSB bit of the issuing instruction is compared against the MSB value stored in that queue entry. If the MSB values are the same in the issuing instruction and queue entry, and the queue entry is currently in an INVALID state, then that instruction may be allowed to write information into that queue entry location. On the other hand, if the MSB values differ between the issuing instruction and the queue entry location, or if the queue entry is currently in a VALID state, then the instruction will not be allowed to write information into that queue entry location, and a queue full flag is set, which lets the main processor know to stop issuing instructions.

As each individual queue entry is freed up by the completion of its stored instruction, the MSB bit value is switched in a process known as "being complemented". This prepares the queue entry location to accept information regarding the next instruction that may legitimately occupy that particular queue entry location through the pre-allocation. Typical instructions that may be often executed out of order include memory reference instructions such as load, or store.

In general, the prior art does not allow random entry queues, and thus has no difficulty in determining when a particular queue is full, since the program only need keep track of the number of program instructions sent to the queue, versus the number of completed instructions that have returned from the queue. The queue still has capacity for more instructions if the difference is not larger than the known number of queue memory locations. The present invention provides what are essentially reserved seating arrangements for the individual instructions, while maintaining the knowledge of the original program order, as opposed to the prior art's open stadium seating arrangement.

With such an arrangement significant computer performance improvements may be realized by allowing a main processor to issue instructions out of the normal program order. The improved efficiency in the queuing method allows the program to take advantage of available resources while waiting for unavailable resources to become free, without losing the necessary program instruction order. Thus the present invention reduces the amount of stalling that occurs in the execution of a program, since if the resources required for the execution of the present instruction are not available, it is still possible to execute an instruction whose resources are presently available without losing the required program order.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The invention will be described with reference to an illustrative example of four-entry load memory and store memory queues attached to an eight-entry instruction queue. This illustrative example is given for simplicity and clarity of the invention description, and the extension of the principles of the invention to a preferred thirty-two entry load or store queue will be apparent. Further surrounding details of the microprocessor architecture of the preferred embodiment may be found in Kessler et al., "The Alpha 21264 Microprocessor Architecture", Digital Equipment Corp., International Conference on Computer Design, October 1998, incorporated herein by reference.

Figures 1, 2:
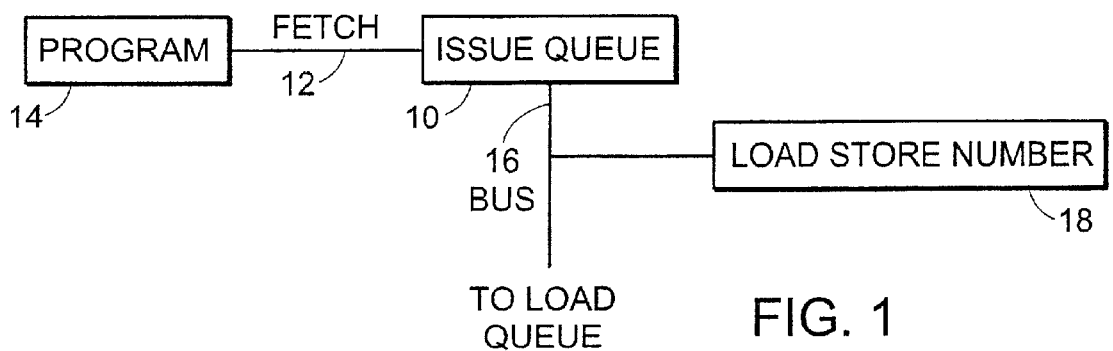
FIG. 1 is a block diagram showing an instruction queue.
FIG. 2 shows, in box 20, the individual instructions in the issue queue of FIG. 1.

FIG. 1 shows an issue queue 10, where a fetch command 12 retrieves instructions from a program 14 in a specific order, known as the program order. A load store number (LSN) is assigned as an extra operation of the fetch command 12, and is recorded in a load store number table 18. The issue queue 10 sends the individual instructions on bus 16 to the appropriate execution queue, such as the load or store queues, to be discussed shortly with reference to FIG. 2, and to the load store number table 18.

FIG. 2 shows, in box 20, the individual instructions in the issue queue 10 (FIG. 1), having a recorded program number 22, (i.e., the INUM), and a specific instruction 24. The issue queue 10 in this illustrative embodiment has only eight entries, but larger numbers of entries may also beneficially use the invention. Certain types of instructions may be executed in an out-of-program-order arrangement without danger of using inappropriate information. Examples of such instructions include the load (i.e., LD) and store (i.e., STO) instructions in issue queue locations 1 and 4 through 8. These instructions are known generally as memory reference instructions, and they may be executed in random order as long as their correct program order is still known. The instructions in locations 2 and 3 are arithmetic instructions that will likely be sent to an arithmetic logic unit (i.e., the ALU), and must be done in proper order to ensure correct program execution. Each load instruction is sequentially assigned a load store number (LSN) 26.

Figure 3:
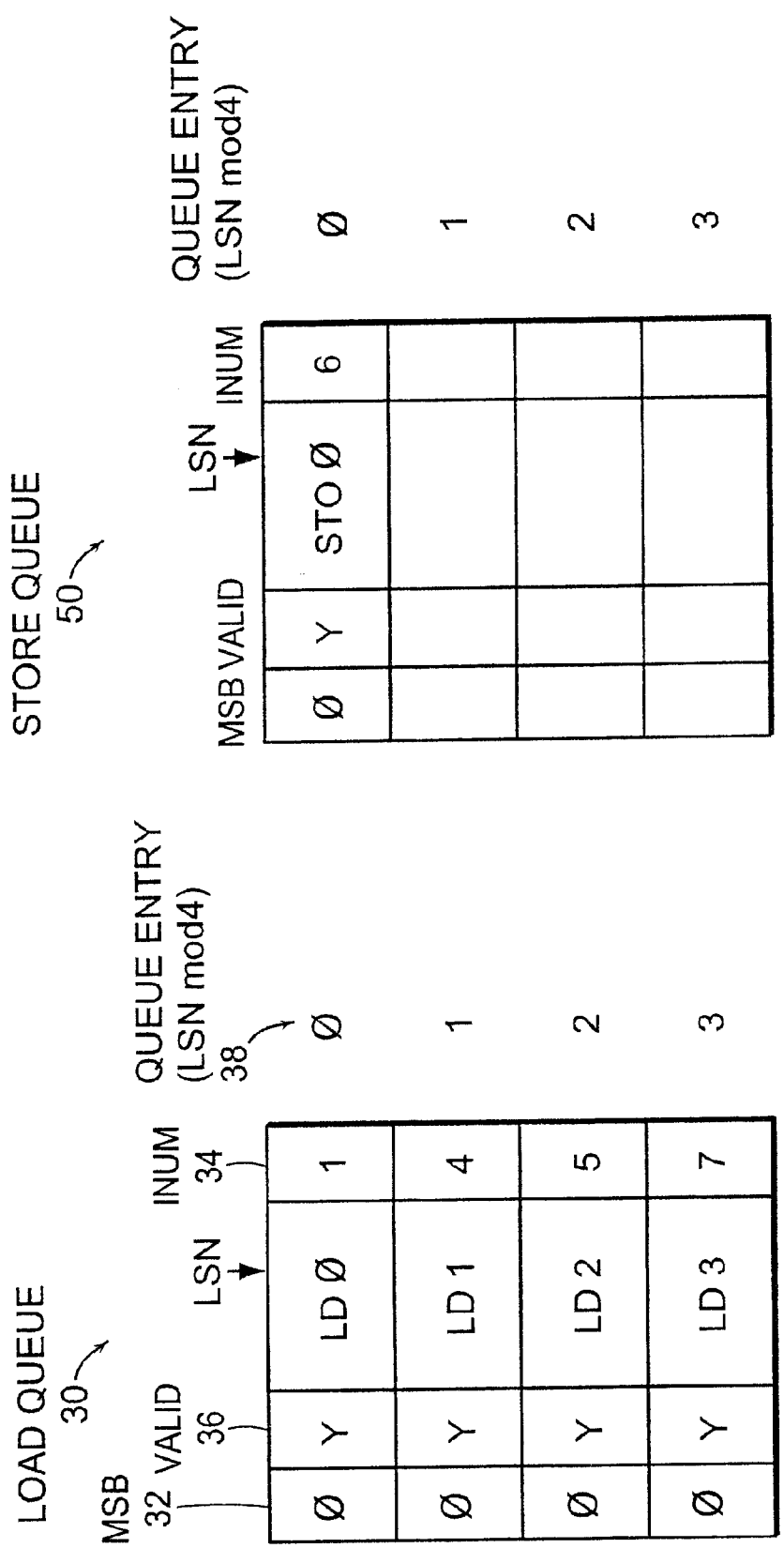
FIG. 3 is a block diagram showing exemplary load and store queues in accordance with a preferred embodiment of the invention.

FIG. 3 shows a load queue 30, having four entries in this simplified illustration, and a store queue 50, also having four entries or locations (numbered at 38) in this simplified illustration. The issue queue 10 sends load instructions (i.e., the instructions in locations 1,4,5,7 and 8 of box 20 in FIG. 2) to the load queue 30 in a random order that depends on the availability of the resources needed to execute the instruction, such as having the indicated memory location free. The load queue 30 places each received load instruction in a particular one of the four possible locations; that is the load instructions are preassigned a correct location in the load queue 30 that keeps the proper program order even though the load instructions are sent to the load queue 30 from the issue queue 10 (box 20) in random order. This is accomplished by a modulus operation performed on the order of the load operation instruction in the program order, for example, on the LSN.

In this illustrative embodiment the load queue 30 has four locations, 0 to 3, and therefore the modulus operation uses the number four as the divisor (, i.e., the modulus). The first program load instruction (INUM 1 in FIG. 1), which has been assigned an LSN of 0, has a modulus status bit 32 (i.e., MSB) of zero and a remainder (, i.e., congruence) of zero, and thus should be entered in load queue 30 entry zero (first location illustrated). Note that the INUM 34 may be recorded in the load queue 30, or in a separate load store table. Also note that although the illustrative example has loaded the load instruction assigned to LSN 0 (shown as LD 0) first into load queue 30, this is not necessary and depends upon the availability of the register that the load instruction is supposed to receive the data point from. For example, the load instruction LD 2 (having INUM=5 and LSN=2) may have been issued by the issue queue 10 before LD 0, based again upon availability of resources. In that case the modulus operation will give a MSB of zero and a remainder of 2 and the instruction would be placed in the appropriate load queue location, entry 2.

The problem with the above described set of operations is that the issue queue 10 does not know whether or not the appropriate load queue 30 location will be available when the resources needed to perform an operation become available, and thus what are known as "collisions" may occur. For example, if the LD (LSN 0) instruction in load queue 30 has not yet been used in the program when the issue queue 10 determines that the LD (LSN 4) instruction (i.e., the instruction in the eighth location in the issue queue box 20) is ready to be sent to the load queue 30, then the following series of steps occurs. The LD (LSN 4) operation is subjected to the modulus operation, resulting in a MSB of 1 and a remainder of zero. Since the remainder is zero, the pre-assigned load queue 30 location is entry 0. The load queue 30 thus looks at location entry 0 and sees that the LD (LSN 0) operation has not yet been completed and that the entry location is not empty. Therefore, the loading of LD (LSN 4) is inappropriate at this time, and no entry is made. An overflow alarm or flag may be set to indicate to the issue queue 10 that it should stop issuing instructions temporarily. The MSB bit 32 essentially tells the issue queue 10 whether or not the instruction is from the correct part of the overall instruction set for that load queue location at the current time.

When the particular operation represented by the entry LD 0 is completed and the data is used by the program, then the entry 0 in the load queue 30 should be cleared for the next instruction, in the current illustrative example the LD 4 instruction. This is done by switching the valid bits 36 from the valid (i.e., the instruction currently in the queue entry is still being worked on and is not yet complete) state of zero to an invalid state (i.e., the instruction has already been sent and is no longer valid). The MSB bit remains set at zero until the first of the next series of load instructions (i.e., the LD 4 instruction in the present illustrative example) has issued. Thus, the issue queue 10 knows whether or not the load queue 30 (or the store queue 50, etc.) is ready to accept more randomly sent load instructions, (i.e., the queue 30, 50 is no longer full) by the combination of the valid bit value 36 and the MSB bit value 32.

The basic operation of the queues 30, 50 may be summarized as loading the load queue 30 in a quasi random order based upon resource availability, keeping the LSN numbers 34 in ascending order. When the load instructions are executed in proper ascending order, and the load queue 30 should be freed up for the next group of four load instructions, the valid bits 36 are cleared (i.e., switched to zero) and the MSB bit 32 is toggled.

In a preferred embodiment of a 32 entry load queue there would be five bits in the LSN, and a single MSB bit and valid bit. The MSB bit would be toggled after all 32 entries have had the valid bit cleared. In this fashion the correct program instruction order may be maintained even if the entries to the load queue have been made in a non program (Random insertion) order.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for executing program instructions, comprising the steps of:
    assigning unique numbers to program steps of a certain type, based on the order in which the program steps occur in the program;
    issuing, in random order, said program steps of said certain type, to an execution queue;
    for a particular program step of said certain type, randomly selecting a location in the execution queue based upon the unique number assigned to the program step, each location in the execution queue being referenced by a respective specific number;
    determining the value of an instruction valid bit associated with the randomly selected location;
    comparing the result of a numeric calculation to a status bit associated with the randomly selected location, the numeric calculation being performed on the unique number assigned to the program step;
    determining, based upon the instruction valid bit and the comparison of the numeric calculation result to the status bit, whether the randomly selected location is occupied;
    storing the program step in the randomly selected location if the selected location is empty; and
    issuing a memory full flag if the randomly selected location is occupied.

2. The method of claim 1, wherein the unique number is a monotonically ascending series of integers assigned to the program steps in the same order as the program is executed.

3. The method of claim 1, wherein the execution queue is one of a load queue and a store queue.

4. The method of claim 1, wherein the program step is issued to the execution queue in an order determined by an availability of a selected one of a plurality of computation resources.

5. The method of claim 1, wherein each program step issued to the execution queue is assigned a queue location number based upon ascending value of the unique number assigned to the program step.

6. The method of claim 5, wherein the assigned queue location number is one of a plurality of numbered locations in each one of a plurality of execution queues and is selected by calculating and recording a modulus of the queue location number.

7. The method of claim 6, wherein the divisor of the modulus calculation is equal to a number of locations in the queue.

8. The method of claim 7, wherein the status bit of the randomly selected location is switched when said location becomes invalid.

9. The method of claim 1, wherein a load queue is part of the execution queue.

10. An apparatus for executing program instructions, comprising:

means for assigning unique numbers to program steps of a certain type, based on the order in which the program steps occur in the program;

means for issuing, in random order, said program steps of said certain type, to an execution queue;

means for randomly selecting, for a particular program step of said certain type, a location in the execution queue based upon the unique number assigned to the program step, each location in the execution queue being referenced by a respective specific number;

means for determining the value of an instruction valid bit associated with the randomly selected location;

means for comparing the result of a numeric calculation to a status bit associated with the randomly selected location, the numeric calculation being performed on the unique number assigned to the program step;

means for determining, based upon the instruction valid bit and the comparison of the numeric calculation result to the status bit, whether the randomly selected location is occupied;

means for storing the program step in the randomly selected location if the selected location is empty; and means for issuing a memory full flag if the randomly selected location is occupied.

11. The apparatus of claim 10, further comprising a plurality of computer systems, all with access to a plurality of computation resources.

12. The apparatus of claim 10, wherein the unique number is a monotonically ascending series of integers assigned to the program steps in the same order as the program is executed.

13. The apparatus of claim 10, wherein the execution queue is one of a load queue and a store queue.

14. The apparatus of claim 10, wherein the execution queue is selected out of a plurality of execution queues based on the type of the instruction step, and the program step is issued to the execution queue in an order determined by an availability of a selected one of a plurality of computation resources.

15. The apparatus of claim 14, wherein each program step issued to the execution queue is assigned a queue location number based upon ascending value of the unique number assigned to the program step.

16. The apparatus of claim 15, wherein the assigned queue location number is one of a plurality of numbered locations in each one of the plurality of execution queues and is selected by calculating and recording a modulus of the queue location number.

17. The apparatus of claim 16, wherein the divisor of the modulus calculation is equal to a number of locations in the queue.

18. The apparatus of claim 17, wherein the status bit of the randomly selected location is switched when said location becomes invalid.

19. The apparatus of claim 10, wherein a load queue is part of the execution queue.

* * * * *